United States Patent Office 2,935,449
Patented May 3, 1960

2,935,449
STABILIZED VITAMIN A COMPOSITIONS
Abraham Bavley, Brooklyn, and Albert E. Timreck, Forest Hills, N.Y., assignors to Chas. Pfizer & Co., Inc., Brooklyn, N.Y., a corporation of Delaware
No Drawing. Application April 14, 1958
Serial No. 728,037
6 Claims. (Cl. 167—81)

This invention relates to the stabilization of vitamin A esters against loss in potency, and it is particularly concerned with vitamin A compositions comprising an intimate mixture of a vitamin A fatty acid ester containing a synergistic antioxidant mixture consisting of 6-ethoxy-2,2,4-trimethyl-1,2-dihydroquinoline and phenolic antioxidants dispersed in gelatin together with a hydroxycarboxylic acid stabilizer.

Vitamin A, whether in alcohol, ester or other well-known form, is normally subject to objectionable loss in vitamin potency upon prolonged storage unless it is stabilized in some way. Furthermore, many of the well-known materials which are commonly used for stabilizing fats or the like against oxidation are largely ineffective in stabilizing either natural or synthetic vitamin A compositions against loss in potency. It should be noted that the potency stabilization of vitamin A is of particular importance in the highly potent vitamin A preparations normally sold for incorporation into foods, for use in multi-vitamin preparations or the like, or for other pharmaceutical uses, since the tendency toward potency loss is accentuated by increasing concentration. The most common commercial vitamin A compositions are the fatty acid esters of vitamin A prepared in concentrated form from fish liver oils or the like, and vitamin A acetate and vitamin A palmitate prepared by organic synthesis from suitable starting materials; these concentrates may be diluted to the desired potency.

In the present invention, the term "vitamin A" is understood to include any of the well-known vitamin A active esters whether prepared synthetically or obtained from natural sources. For products requiring high stability under conditions of high relative humidity or in aqueous dispersion, it is preferable to employ vitamin A fatty acid esters wherein the fatty acid moiety is derived from an aliphatic hydrocarbon monocarboxylic acid having at least eight carbon atoms; these fatty acids may either be saturated or unsaturated. This invention is of particular importance in the stabilization of those vitamin A compositions having a vitamin A potency of at least 250,000 U.S.P. units of vitamin A per gram, but it is also applicable to lower potency concentrates, such as those having potencies of 10,000 U.S.P. units of vitamin A per gram or lower. There is also included within the purview of this invention vitamin A compositions containing an edible fat or oil such as is present in natural oil concentrates, or in synthetically prepared concentrates having the potency adjusted to a desired value with an edible oil, such as cottonseed oil or the like.

In particular, this invention specifically relates to stabilized vitamin A fatty acid ester compositions containing 6-ethoxy-2,2,4-trimethyl-1,2-dihydroquinoline and to methods for preparing them; these compositions are all stable against potency loss caused by heat and high relative humidity. More particularly, it relates to compositions containing vitamin A fatty acid esters having from 8 to 20 carbon atoms in the acyl moiety of the ester grouping. 6-ethoxy-2,2,4-trimethyl-1,2-dihydroquinoline is commercially available from the Monsanto Chemical Company, St. Louis, Missouri, under the trademark name, "Santoquin."

Hitherto, it has been the custom to administer vitamins to domestic animals of any size via the animal feeds. In order that the vitamins be well dispersed, they are normally premixed with a carrier substance which is then dispersed in the feedstuff in the form of a powder or fine granulate. However, it is observed that when this procedure is used for vitamin A, the activity decreases rapidly during storage. Trace elements such as iron and/or copper catalyze the destruction of vitamin A so that the latter may no longer be detected even after a few days. The vitamin A active compositions prepared according to this invention are useful for administration as such, and also for formulations of pharmaceutical preparations such as tablets, capsules, powders, liquid vitamin A solutions and the like, as well as for animal feeds.

In the past, it has been noted that vitamin A esters alone are unstable, particularly when exposed to air or oxygen or when subjected to conditions of heat and high relative humidity. In addition, other materials such as enzyme-containing ingredients contribute to loss of vitamin A activity. Hence, preparations containing vitamin A esters frequently deteriorate in a relatively short time when exposed to air under normal storage conditions. Synthetic vitamin A active materials are particularly subject to loss of activity in storage since natural antioxidants found with vitamin A compounds in naturally occurring sources are not present in the synthetic materials.

In accordance with the prior art, acidic synergists have been used for years with phenolic antioxidants to protect edible fats and vegetable oils from rancidity. Ascorbic acid and its monoesters as well as citric acid and its esters have been used. In U.S. Patent No. 2,605,186 there is described the use of other hydroxycarboxylic acids and ketocarboxylic acids, such as acetonedicarboxylic acid, which have also been reported to be effective. In U.S. Patent No. 2,686,751 there is described the use of synergistic mixtures of monoesters of citric acid with phenolic antioxidants, which mixtures stabilize vitamin A compositions. In a publication appearing in the Journal of the Indian Chemical Society, vol. 31, pages 232–249 (1954), the importance of trace metals in the inactivation of vitamin A is described. However, the stabilizing effect of citric and ascorbic acids with phenolic antioxidants is not related to their chelating action alone. We have found that other carboxylic acids which are not metal sequestrants also exhibit this stabilization. Furthermore, the addition of hydroxycarboxylic acids and their salts to the aqueous phase of the vitamin A emulsion gave products of improved stability. In particular, the alkali metal salts of ascorbic acid, citric acid, tartaric acid, gluconic acid, 2-keto-L-gulonic and acetonedicarboxylic acid, such as sodium ascorbate, potassium ascorbate, monolithium citrate, monosodium citrate, trisodium citrate, tripotassium citrate, potassium acid tartrate, potassium sodium tartrate, sodium gluconate, potassium gluconate, sodium 2-keto-L-gulonate, dipotassium acetonedicarboxylic acid and the like, as well as the acids themselves, were found to be the most effective and are approximately equal with regard to their efficiency. Finally, the direct addition of small quantities of the free acids and their monoesters, such as methyl ascorbate, palmityl ascorbate, triethyl citrate, monoisopropyl citrate, stearyl gluconate, dibutyl tartrate, dimethyl acetonedicarboxylate, lauryl 2-keto-L-gulonate and the like, to the vitamin A esters afforded enhanced stability.

A primary object of the present invention is to provide new vitamin A compositions which are stabilized against objectionable losses in potency when the product is used in aqueous dispersions or when it is subjected to conditions of high relative humidity. Other objects and advantages of this invention will become apparent during the course of the following description.

In accordance with the present invention, there are now provided vitamin A fatty acid esters stabilized against objectionable losses in potency by incorporating vitamin A compositions containing a synergistic antioxidant mixture consisting of at least 0.1% by weight of a phenolic antioxidant and at least 0.5% by weight of 6-ethoxy-2,2,4-trimethyl-1,2-dihydroquinoline, both based on the weight of the vitamin A compound, in a water-dispersible gelable colloid together with a small amount of a stabilizing mixture comprising at least 1% by weight of a hydroxycarboxylic acid, or an alkali metal salt or aliphatic hydrocarbon carboxylic acid ester thereof.

It should be pointed out, this is the first known instance of a case where 6-ethoxy-2,2,4-trimethyl-1,2-dihydroquinoline has been reported to exhibit synergism. As previously indicated by C. Thompson in U.S. Patent No. 2,562,970, this compound has been used alone as an antioxidant for the protection of β-carotene; however, the latter substance is a polyene compound lacking an ester functional group. Accordingly, it could not possibly be expected to undergo hydrolysis and hence, it is more easily stabilized than are the vitamin A fatty acid esters. The fact that 6-ethoxy-2,2,4-trimethyl-1,2-dihydroquinoline is a poor antioxidant for the vitamin A fatty acid esters when used alone confirms this point of view.

Thus, it is surprising but true that when 6-ethoxy-2,2,4-trimethyl-1,2-dihydroquinoline is admixed with one or more of the phenolic antioxidants, particularly those hydroxy aromatic compounds selected from the group consisting of alkylated phenols and acylated phenols wherein the alkyl group has from one to six carbon atoms and the acyl group has from one to five carbon atoms, such as the hydroxyquinolines, tocopherols, aralkoxylated phenols, lower acylated phloroglucinols, alkyl gallates, butylated phenols, alkylated hydroxyanisoles, alkylated hydroxytoluenes and the like, the resulting synergistic mixture imparts greatly improved potency stability to vitamin A compositions; preferred phenolic antioxidants include α-tocopherol, p-(benzyloxy)phenol, nordihydroguaiaretic acid, 2,4,5-trihydroxybutyrophenone, n-propyl gallate, butylated hydroxyanisole and butylated hydroxytoluene. Optimum results are obtained by using each component of the synergistic mixture in amounts of from about 0.05% to about 10% by weight, both based on the weight of vitamin A stabilized. Particularly good results are obtained by the use of two or more phenolic antioxidants in conjunction with 6-ethoxy-2,2,4-trimethyl-1,2-dihydroquinoline. It is usually desirable to employ a higher percentage of phenolic antioxidant than 6-ethoxy-2,2,4-trimethyl-1,2-dihydroquinoline, although the proportions can be varied over wide ranges if desired.

In accordance with a specific embodiment of the present invention, the data presented in Table I illustrates the stability of vitamin A compositions containing various single stabilizers and synergistic combinations of these. The vitamin A employed is a synthetic vitamin A palmitate having a potency of 1,800,000 U.S.P. units of vitamin A per gram. The preparation of the vitamin A compositions assaying for 250,000 units per gram are described in Example I. The stability studies are carried out on 20–50 mesh granulets. Samples are stored in amber bottles at room temperature (about 26° C.) for three months, after which time they are assayed spectrophotometrically by the standard U.S.P. procedure. These samples are also evaluated for stability in mixed feed formulations in a forced air-draft constant temperature oven having a relative humidity of 70% at 30° C.; after every week, the sample is weighed to determine the amount of moisture absorbed; an equilibrium moisture content of 12.7% is attained in about two weeks. After thorough mixing, a 200 g. sample is withdrawn and assayed for vitamin A content by means of the Carr-Price colorimetric test method using antimony trichloride, each sample being checked in replicate. The test is then continued for another six weeks.

TABLE I

Stability studies on 20–50 mesh products

| Stabilizer [1] | Percent Potency Retention | |
|---|---|---|
| | Shelf Storage at 26° C. for 3 months | 70% Relative Humidity at 30° C. for 8 weeks |
| 2.0% BHA/BHT (1/2) [2,3] | 95–98 | 80–85 |
| 0.7% 6-ethoxy-2,2,4-trimethyl-1,2-dihydroquinoline | 78 | 48 |
| 3.5% 6-ethoxy-2,2,4-trimethyl-1,2-dihydroquinoline | 83 | 79 |
| 3.5% 6-ethoxy-2,2,4-trimethyl-1,2-dihydroquinoline | 95 | 89 |
| 0.7% 6-ethoxy-2,2,4-trimethyl-1,2-dihydroquinoline + 2.0% BHA/BHT (1/2) | 89 | 92 |
| 1.4% 6-ethoxy-2,2,4-trimethyl-1,2-dihydroquinoline + 0.7% n-propyl gallate | 99 | 96 |
| 0.7% 6-ethoxy-2,2,4-trimethyl-1,2-dihydroquinoline + 1.5% BHA/BHT (1/2) | 100 | 98 |

[1] 1% = 10 mg. of antioxidant per million units of vitamin A palmitate.
[2] BHA/BHT (1/2) = one part by weight of butylated hydroxyanisole to two parts by weight of butylated hydroxytoluene.
[3] All of the above formulations except Nos. 2, 3 and No. 5 contain 2% sodium ascorbate and 1% sodium citrate, based on total formulation weight.

It is apparent from Table I that 6-ethoxy-2,2,4-trimethyl-1,2-dihydroquinoline alone gives but slight improvement in stability over that obtained with vitamin A palmitate containing no antioxidant in these formulations, whereas it is potentiated by hydroxycarboxylic acid salts and affords synergistic mixtures with phenolic antioxidants, thus offering greatly improved potency stability of vitamin A compositions over a prolonged period or when such compositions are subjected to conditions of high relative humidity. It should be mentioned here that in all vitamin A stabilization work performed by us and by others, the use of n-propyl gallate gives inferior products as compared to those obtained with butylated hydroxyanisole and butylated hydroxytoluene.

The data presented in Table II further illustrates the greatly enhanced stability attained by the use of this basic synergist in stabilized vitamin A compositions prepared as described in Example III and as covered in U.S. Patent No. 2,689,202. In this instance, the stability studies were carried out on 40–80 mesh granulets and the samples were tested for stability after shelf storage at 26° C. for 30 days, in aqueous dispersion (100 units/ml.) at 25° C. for 48 hours and, finally, in open vials at 56° C. for three weeks.

TABLE II

Stability studies on 40–80 mesh products

| Stabilizer [1] | Percent Potency Retention | | |
|---|---|---|---|
| | Shelf Storage at 26° C. for 30 Days | Open Vials at 56° C. for 3 Weeks | In Aqueous Dispersion (100 u./ml.) at 25° C. for 48 hrs. |
| 1.0% BHA/BHT (1/2) [2,3] | 99 | 85 | 67 |
| 2.0% BHA/BHT (1/2) | 97 | 84 | 86 |
| 2.0% BHA/BHT (1/2)+0.5% n-propyl gallate | 98 | 89 | 90 |
| 2.0% Tocopherol | 97 | 88 | 11 |
| 1.0% Tocopherol+0.2% n-propyl gallate | 98 | 89 | 46 |
| 2.0% BHA/BHT (1/2)+1% Tocopherol | 98 | 91 | 92 |
| 2.0% BHA/BHT (1/2)+0.2% 6-ethoxy-2,2,4-trimethyl-1,2-dihydroquinoline | 99 | 92 | 98 |
| 2.0% BHA/BHT (1/2)+0.4% 6-ethoxy-2,2,4-trimethyl-1,2-dihydroquinoline | 100 | 95 | 98 |

[1] 1% = 10 mg. of antioxidant per million units of vitamin A palmitate.
[2] BHA/BHT (1/2) = one part by weight of butylated hydroxyanisole to two parts by weight of butylated hydroxytoluene.
[3] All the above formulations contain 2% sodium ascorbate and 1% sodium citrate, based on total formulation weight.

As illustrated by the data in Table II, particularly good results are obtained by using a synergistic mixture of 6-ethoxy-2,2,4-trimethyl-1,2-dihydroquinoline with butylated hydroxyanisole and butylated hydroxytoluene. It should be noted that the other stabilizing compositions which do not contain this particular dihydroquinoline derivative are not as stable in aqueous dispersion. Furthermore, compositions containing 6-ethoxy-2,2,4-trimethyl-1,2-dihydroquinoline together with other stabilizers exhibit very low corrections (Morton-Stubbs) in the U.S.P. assay after thirty days at room temperature and after three weeks at 56° C. In view of the fact that compositions which do not contain 6-ethoxy-2,2,4-trimethyl-1,2-dihydroquinoline show much higher negative corrections, it would appear that practically no decomposition occurs when this particular basic synergist is used in the stabilizing compositions.

Hence, the results described in this invention show that 6-ethoxy-2,2,4-trimethyl-1,2-dihydroquinoline is potentiated by hydroxycarboxylic acid type compounds even though 6-ethoxy-2,2,4-trimethyl-1,2-dihydroquinoline itself is an inferior antioxidant for vitamin A esters when used alone. Furthermore, it affords synergistic mixtures with phenolic antioxidants, such as alkylated phenols, e.g., n-propyl gallate, and mixtures of butylated hydroxyanisole and butylated hydroxytoluene. Thus, vitamin A compositions possessing superior stability against objectionable potency losses are provided by means of this invention, which involves the utilization of synergistic stabilizing mixtures as described herein. Of especial value, is the fact that 6-ethoxy-2,2,4-trimethyl-1,2-dihydroquinoline on admixture with phenolic antioxidants confers exceptionally high stability to water-dispersible gelatin vitamin A products when the latter are used in aqueous dispersions; it is also of great value in dry gelatin vitamin A compositions where their use will subject them to conditions of high relative humidity.

The invention is further illustrated by the following examples, which are not to be considered as imposing any limitation on the scope thereof.

EXAMPLE I

In a small, wide-mouth reaction vessel, such as a resin pot, equipped with a stirrer, 45 g. of corn syrup were dissolved in 76 ml. of distilled water which had been previously boiled and then purged of dissolved air with nitrogen. To this solution 50 g. of gelatin (45 Bloom) was added. When the gelatin had absorbed the aqueous solution, the mixture was heated in a water bath to 65–70° C. with stirring until a uniform dispersion was obtained. The suspension was then blanketed with nitrogen and 1 g. of sodium ascorbate and 1 g. of sodium citrate were dissolved in the gelatin solution. After thoroughly flushing the vessel with nitrogen, 15 g. of vitamin A palmitate containing 0.14 g. of butylated hydroxyanisole and 0.28 g. of butylated hydroxytoluene and 0.2 g. of 6-ethoxy-2,2,4-trimethyl-1,2-dihydroquinoline were emulsified into the gelatin with vigorous agitation. After stirring for 30 minutes, the emulsion was homogeneous and the vitamin A was finally dispersed in the gelatin suspension. Stirring was continued while the reaction mixture was allowed to cool to about 50° C. The emulsion was then cast between layers of polyethylene to obtain a sheet of about one-eighth of an inch in thickness. After further cooling, the gelatin set and the sheet was then stripped and air dried at room temperature overnight. The sheet was then cut into pieces about 1" square and these were dried in a "Proctor-Swartz" forced convection oven at 50° C. until brittle (24–48 hours).

The dried chips so obtained were frozen by mixing them with about an equal weight of Dry Ice. The product was then ground in a pre-cooled hammer mill (Fitzpatrick comminuting machine, Model D) through a 2 AA perforated plate having holes roughly equivalent to 10 mesh (0.078" in diameter). The granulated material was washed with hexane to remove the vitamin A exposed on the surface; about 4–5% of the vitamin A used was found in this wash. The granulets were dried overnight in a vacuum desiccator at 1–2 mm. Hg pressure to obtain a product containing about 5% moisture. The product was screened to collect the material in the 20–50 mesh range; this material, assaying 250,000 units/g., was used the stability studies.

A sample of the product weighing 0.18 g. was preblended with 200 g. of poultry feed in a capped 625 ml. amber bottle on a roller blender for one hour. The preblend was added to an additional 800 g. of inactive feed and mixed in a four quart twin-shell blender for 30 minutes. A 200 g. sample was then withdrawn for zero day potency and for three months' shelf storage; the shelf sample was held at room temperature (about 26° C.) in enclosed amber glass bottles. The remaining 800 g. of mixed feed were placed in a cloth bag 5" x 11" and stored in 70% relative humidity at 30° C. Every two weeks the bag of feed was weighed to determine the amount of moisture absorbed; under these conditions the sample reached an equilibrium moisture content of 12.7% in about two weeks. After mixing thoroughly, the 200 g. sample was taken for assay, which test was performed in replicate and according to a modification of the colorimetric test procedure of Carr-Price. It was found that the sample exhibited a potency retention of 100% after shelf storage at 26° C. for three months and gave a potency retention of 98% after being subjected to a 70% relative humidity at 30° C. for eight weeks.

EXAMPLE II

In a wide-mouth reaction vessel, such as a resin pot equipped with a stirrer, 45 g. of corn syrup were dissolved in 76 ml. of distilled water which had previously been boiled and then purged of dissolved air with nitrogen. To this solution 50 g. of gelatin (45 Bloom) were added and when the gelatin had absorbed the aqueous solution, the mixture was heated in a water bath to 65–70° C. with stirring until a uniform dispersion was obtained. The suspension was then blanketed with nitrogen and 1 g. of sodium ascorbate and 1 g. of sodium citrate were dissolved in the gelatin solution. After thoroughly flushing the solution with nitrogen, 15 g. of vitamin A palmitate containing 0.4 g. of 6-ethoxy-2,2,4-trimethyl-1,2-dihydroquinoline and 0.2 g. of n-propyl gallate was emulsified into the gelatin with vigorous agitation. The same procedure as in Example I was followed for the work-up of the reaction mixture as well as for the isolation of the product; the evaluation of the experimental formulation was also carried out as in Example I. It was found that a potency retention of 99% was obtained after the 20–50 mesh granulets were subjected to shelf storage at 26° C. for three months and a potency retention of 96% was obtained after the sample was subjected to 70% relative humidity at 30° C. for eight weeks.

EXAMPLE III

Using the same procedure as in Example I, 179 g. of corn syrup were dissolved in 160 ml. of distilled water, etc., and to this solution 198 g. of gelatin (45 Bloom) were added. After proceeding as in Example I, 8.0 g. of sodium ascorbate and 4.0 of sodium citrate were dissolved in the gelatin solution. The vessel was then thoroughly flushed with nitrogen and 64.8 g. of vitamin A palmitate containing 0.8 g. of butylated hydroxyanisole and 1.6 g. of butylated hydroxytoluene together with 0.2 g. of 6-ethoxy-2,2,4-trimethyl-1,2-dihydroquinoline and 0.10 g. of ascorbic acid were emulsified into the gelatin with vigorous agitation. The isolation of the product was carried out as described in Example I, except that the material was collected in the 40–80 mesh range. These granulets were tested for stability in aqueous dispersion (100 units/ml.) at 25° C. for 48 hours as well as in open vials at 56° C. for three weeks, in addition to shelf storage at 26° C. for 30 days. It was found that a potency retention of 99% was obtained after shelf storage at 26° C. for 30 days, while a potency retention of 98% was obtained after 48 hours in aqueous dispersion (100 units/ml.) at 25° C. It was also found that a potency retention 92% was afforded by the sample after it had been placed in an open vial at 56° C. for three weeks.

EXAMPLE IV

The same procedure as described in Example III was followed here except that twice as much 6-ethoxy-2,2,4-trimethyl-1,2-dihydroquinoline was employed. It was found that a potency retention of 100% was obtained after shelf storage at 26° C. for 30 days, while a potency retention of 98% was obtained in aqueous dispersion (100 units/ml.) at 25° C. for 48 hours and a potency retention of 95% was afforded when the sample was placed in an open vial at 56° C. for three weeks.

It can be seen from the included tables that compositions containing 6-ethoxy-2,2,4-trimethyl-1,2-dihydroquinoline as the only antioxidant exhibit lower stability, especially under conditions of high relative humidity and in aqueous dispersion.

EXAMPLE V

The same procedure as described in Example I was followed here except that 0.18 g. of butylated hydroxyanisole and 0.36 g. of butylated hydroxytoluene was used, and the mixture consisting of 1 g. of sodium ascorbate and 1 g. of sodium citrate was omitted. It was found that a potency retention of 89% was obtained after shelf storage at 26° C. for three months, while a potency retention of 92% was obtained after the sample had been subjected to a 70% relative humidity at 30° C. for eight weeks.

EXAMPLE VI

The procedure employed was the same as that described in Example I except that a vitamin A corn oil fatty acid ester was used in place of vitamin A palmitate. The vitamin A corn oil ester was prepared by transesterifying vitamin A acetate with corn oil as described by W. Steig et. al., in U.S. Patent No. 2,693,435. The vitamin A corn-oil ester so obtained consisted chiefly of vitamin A oleate and vitamin A linoleate, but it also contained substantial portions of vitamin A palmitate, vitamin A stearate and vitamin A arachidate. The results obtained were substantially the same as those reported in Example I.

EXAMPLE VII

The procedure employed was the same as that described in Example I except that a vitamin A coconut oil fatty acid ester was used in place of vitamin A palmitate. The vitamin A coconut oil ester was prepared by transesterifying vitamin A acetate with coconut oil in accordance with the procedure described in U.S. Patent No. 2,693,435. The vitamin A coconut oil ester so obtained consisted chiefly of vitamin A laurate and vitamin A myristate, but it also contained substantial amounts of vitamin A caprylate, vitamin A caprate, vitamin A palmitate and vitamin A stearate. The results obtained were substantially the same as those reported in Example I.

EXAMPLE VIII

The procedure employed was the same as that described in Example II except for the fact that 0.20 g. of 2,4,5-trihydroxybutyrophenone was the antioxidant employed in conjunction with 6-ethoxy-2,2,4-trimethyl-1,2-dihydroquinoline, and the results obtained were substantially the same.

EXAMPLE IX

The procedure employed was the same as that described in Example II except that 0.2 g. of ethyl gallate was the phenolic antioxidant used in place of n-propyl gallate, and the results obtained were substantially the same. In the same manner, n-butyl gallate was also used with substantially the same results being obtained as reported in Example II when n-propyl gallate was employed.

EXAMPLE X

The procedure described in Example I was followed except that palmityl ascorbate and triethyl citrate were the stabilizing agents employed in place of sodium ascorbate and sodium citrate; the results obtained were essentially the same as those reported in Example I.

In the same manner, nordihydroguaiaretic acid and citric acid were employed as the stabilizers with substantially the same results being obtained, as is the case when stearyl gluconate and dibutyl tartrate are employed; the use of dimethyl acetonedicarboxylate and lauryl 2-keto-L-gulonate as stabilizing agents also affords the same results.

This application is a continuation-in-part of our co-pending application Serial No. 634,432, filed January 16, 1957, and now abandoned.

What is claimed is:

1. A stabilized vitamin A composition comprising an intimate mixture in gelatin of a vitamin A fatty acid ester having at least eight carbon atoms in the acyl moiety of the ester grouping, a stabilizer selected from the group consisting of hydroxycarboxylic acids, ketocarboxylic acids, their alkali metal salts and aliphatic hydrocarbon carboxylic acid esters, and a synergistic antioxidant mixture comprising 6-ethoxy-2,2,4-trimethyl-1,2-dihydroquinoline together with a phenolic antioxidant selected from the group consisting of alkylated phenols and acylated phenols wherein the alkyl group has from one to six carbon atoms and the acyl group has from one to five carbon atoms.

2. A stabilized vitamin A composition as claimed in claim 1 wherein the vitamin A fatty acid ester is vitamin A palmitate.

3. A stabilized vitamin A composition as claimed in claim 1 wherein the vitamin A fatty acid ester is a mixture of corn oil esters of vitamin A.

4. A stabilized vitamin A composition as claimed in claim 1 wherein the vitamin A fatty acid ester is a mixture of coconut oil esters of vitamin A.

5. A stabilized vitamin A composition as claimed in claim 1 wherein the phenolic antioxidant is n-propyl gallate present in an amount that is at least 0.1% by weight, based on the weight of the vitamin A compound.

6. A stabilized vitamin A composition as claimed in claim 1 wherein the phenolic antioxidant is a mixture consisting of one part by weight of butylated hydroxyanisole and two parts by weight of butylated hydroxytoluene, said mixture being present in an amount that is at least 0.2% by weight, based on the weight of the vitamin A compound, and the stabilizer contains at least 0.2% by weight of ascorbic acid, based on the weight of the finished product.

References Cited in the file of this patent

UNITED STATES PATENTS

| | | |
|---|---|---|
| 2,218,591 | Taylor | Oct. 22, 1940 |
| 2,562,970 | Thompson | Aug. 7, 1951 |
| 2,686,751 | Embree | Aug. 17, 1954 |
| 2,689,202 | Bavley | Sept. 14, 1954 |
| 2,693,435 | Stieg | Nov. 2, 1954 |
| 2,711,962 | Bickoff | June 28, 1955 |